(12) United States Patent
Mehmet

(10) Patent No.: US 6,857,648 B2
(45) Date of Patent: Feb. 22, 2005

(54) PEDAL SCOOTER

(76) Inventor: Tuncer Mehmet, Glendalough, The Green, Sidcup, Kent DA 14 6BS (GB)

( * ) Notice: Subject to any disclaimer, the term of this patent is extended or adjusted under 35 U.S.C. 154(b) by 40 days.

(21) Appl. No.: 10/410,156

(22) Filed: Apr. 10, 2003

(65) Prior Publication Data
US 2003/0193160 A1 Oct. 16, 2003

(30) Foreign Application Priority Data

Apr. 12, 2002 (GB) .............................................. 0208405

(51) Int. Cl.[7] .............................................. B62M 1/10
(52) U.S. Cl. ...................................... 280/217; 280/221
(58) Field of Search ................................ 280/217, 215, 280/221, 252, 254, 255, 87.021, 87.041

(56) References Cited

U.S. PATENT DOCUMENTS

| | | | | | |
|---|---|---|---|---|---|
| 1,014,279 | A | * | 1/1912 | Auger | 280/221 |
| 1,551,412 | A | * | 8/1925 | Lopez | 74/414 |
| 1,601,249 | A | * | 9/1926 | Hayden | 280/221 |
| 1,632,308 | A | * | 6/1927 | Mertie | 280/221 |
| 1,798,971 | A | * | 3/1931 | Clements | 280/215 |
| 2,141,233 | A | * | 12/1938 | Corwin | 280/217 |
| 2,607,613 | A | * | 8/1952 | Lesaunier | 280/217 |
| 4,108,459 | A | * | 8/1978 | Alvigini | 280/215 |
| 4,705,284 | A | * | 11/1987 | Stout | 280/250.1 |
| 4,768,607 | A | * | 9/1988 | Molina | 180/165 |
| 4,779,485 | A | * | 10/1988 | Dollison et al. | 74/661 |
| 5,163,696 | A | | 11/1992 | Pesco, Sr. | |
| 5,826,897 | A | * | 10/1998 | Beard | 280/250.1 |
| 6,270,102 | B1 | | 8/2001 | Fan | |
| 6,334,838 | B1 | * | 1/2002 | Lee | 482/51 |

FOREIGN PATENT DOCUMENTS

RU          2088460          8/1997

* cited by examiner

Primary Examiner—Anne Marie Boehler
(74) Attorney, Agent, or Firm—Stites & Harbison PLLC; Douglas E. Jackson

(57) ABSTRACT

A pedal scooter comprises a frame carrying a steerable front ground wheel and at least one rear ground wheel. At least one reciprocating pedal is pivotally mounted to the frame about a pedal axis and has a foot engaging surface positioned rearward of the pedal axis. A flywheel is mounted for rotation on the frame. One-way drive connections between the reciprocating pedal and the flywheel and between the flywheel and the rear ground wheel are provided. Downward pivotal movement of the reciprocating pedal by application of the user's foot to the foot engaging surface causes rotation of the flywheel in a drive direction, which in turn causes rotation of the rear ground wheel in the drive direction. Upward pivotal return movement of the reciprocating pedal is possible without preventing continued rotation of the flywheel and the rear ground wheels in the drive direction.

8 Claims, 5 Drawing Sheets

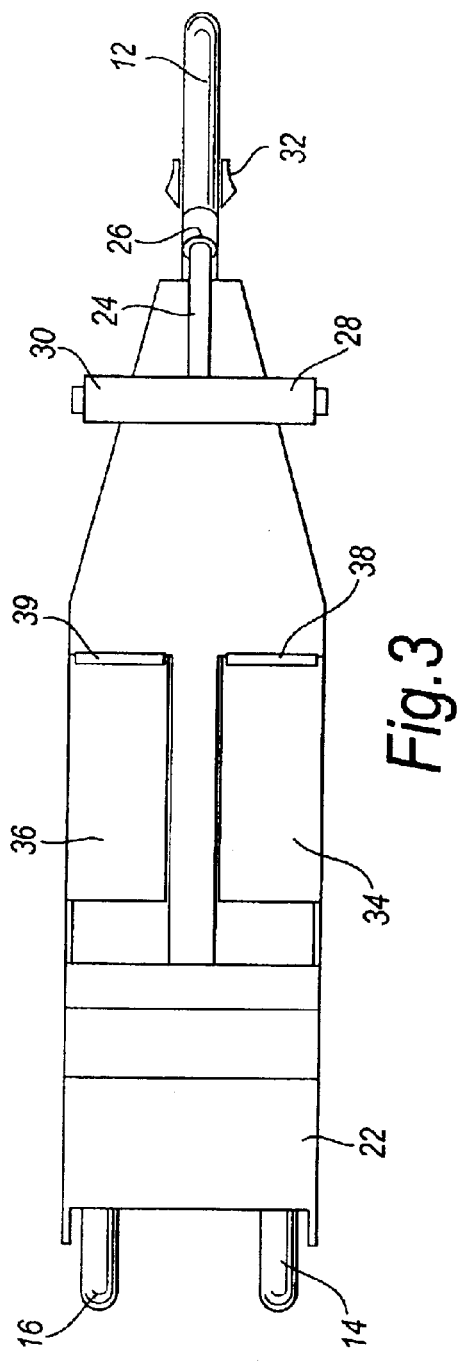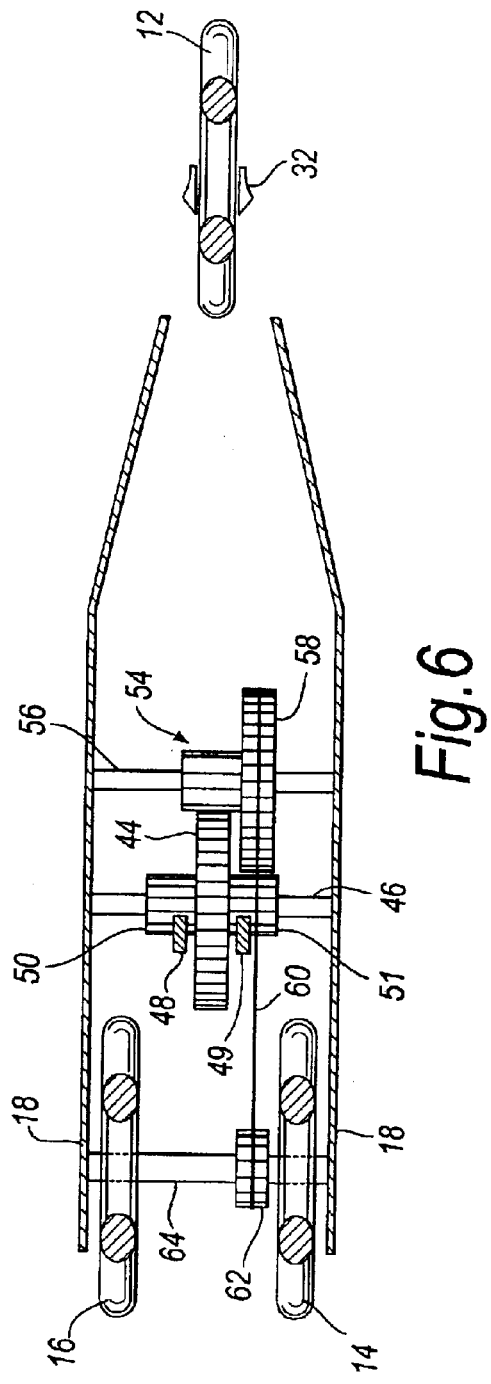

PEDAL SCOOTER

FIELD OF THE INVENTION

The present invention relates to a pedal operated scooter.

BACKGROUND OF THE INVENTION

Scooters have been known for many years. Traditionally they have been available as a child's plaything, but more recently motorized versions have been marketed for use by older children and adults. Basically a scooter consists of a frame carrying a steerable front ground wheel and a rear wheel, the frame providing a platform upon which the rider stands. In the simple non-powered version, the rider stands with one foot on the platform and repeatedly pushes the other foot against the ground to push the scooter along. In the motorized version, the platform may be large enough for the rider to place both feet thereon.

While the motorized versions have the advantage of greater speed, they tend to be noisy and require an energy source such as a heavy rechargeable battery or occasional supplies of fuel.

There is therefore a need to provide a scooter which has improved mobility but which does not suffer from the disadvantages of weight or the need to supply fuel.

A pedal scooter has been described in U.S. Pat. No. 6,270,102-B1 (Fan). The scooter has a frame carrying a steerable front ground wheel and a rear ground wheel. A spring-loaded pedal is pivotally mounted to the frame. An eccentric coupling connects the pedal to a sprocket wheel carrying a drive chain for transferring drive to the rear ground wheel. The connection between the pedal and the sprocket wheel may include a ratchet mechanism to permit one-way drive. There is also a one-way drive connection between the drive chain and the rear ground wheel. This device suffers from a number of disadvantages. For example, the drive includes an eccentric coupling between an arm carried by the pedal and the sprocket wheel. This arrangement provides an unreliable return stroke for the pedal and is a serious disadvantage for the comfort of the rider.

SUMMARY OF THE INVENTION

I have found that the above disadvantages can be largely or completely overcome by constructing the scooter according to the present invention.

According to the invention there is provided a pedal scooter comprising a frame carrying a steerable front ground wheel and a rear ground wheel, a reciprocating pedal pivotally mounted to the frame about a pedal axis and having a foot engaging surface positioned rearward of the pedal axis, a flywheel mounted for rotation on the frame, a one-way drive connection between the reciprocating pedal and the flywheel and a one-way drive connection between the flywheel and the rear ground wheel.

The arrangement is such that downward pivotal movement of the reciprocating pedal by application of the user's foot to the foot engaging surface causes rotation of the flywheel in a drive direction, which in turn causes rotation of the rear ground wheel in the drive direction, whereas upward pivotal return movement of the reciprocating pedal is possible without preventing continued rotation of the flywheel and the rear ground wheels in the drive direction.

Although it is possible to provide only one rear wheel, for better stability preferably two rear ground wheels are carried on the frame.

Although it is possible to provide only one reciprocating pedal, for ease of operation and a smoother ride preferably two reciprocating pedals are provided, side by side, mounted on the frame for independent pivotal movement about a common pedal axis. The or each reciprocating pedal may be spring biased in an upward direction. The independent pivotal movement of the reciprocating pedals allows the scooter to be used in a number of different modes, and in this manner the pedal scooter of the invention differs from the construction of a common bicycle, where traditionally the pedals rotate together at a fixed 180° relationship. Thus, where two reciprocating pedals are provided on the scooter according to the invention, they may be operated alternately. In an alternative mode of use however, both reciprocating pedals are operated together for a more interesting ride. Where only one reciprocating pedal is provided, this may be operated by one foot alone or by two feet together.

The scooter is preferably provided with handle bars, which the user grasps during use.

The one-way drive connection between the reciprocating pedal and the flywheel may include a toothed member carried on the reciprocating pedal and engaging a toothed intermediate wheel mounted for rotation on the frame and a ratchet device between the toothed intermediate wheel and the flywheel. This arrangement may be such as to ensure that rotation of the toothed intermediate wheel in one direction causes the ratchet device to lock, transferring drive from the toothed intermediate wheel to the flywheel, while rotation of the toothed intermediate wheel in the opposite direction unlocks the ratchet device enabling the flywheel to continue to rotate in the drive direction. The toothed intermediate wheel and the flywheel are, for example, mounted on the frame for rotation about a common axis. In one embodiment, the toothed intermediate wheel is biased into face-to-face contact with the flywheel.

The one-way drive connection between the flywheel and the rear ground wheel includes a drive member driven from the flywheel and engaging a rear gearwheel mounted for rotation on the frame and a ratchet device between the rear gearwheel and the rear ground wheel. This arrangement can be such that rotation of the rear gearwheel in one direction causes the ratchet device to lock, transferring drive from the rear gearwheel to the rear ground wheel, while rotation of the rear gearwheel in the opposite direction unlocks the ratchet device enabling the rear ground wheel to continue to rotate in the drive direction. The drive member may be selected from (i) a drive chain engaging sprockets on the drive member carried on the flywheel and on the rear gearwheel; (ii) a drive belt, such as a toothed drive belt; or (iii) a gear train. The rear intermediate gearwheel and the rear wheel are preferably mounted on the frame for rotation about a common axis.

The frame of the scooter may include side plates and a top plate, together constituting a housing within which the flywheel is mounted. Brakes may be provide on the front wheel, one or both of the rear wheels, or both.

The frame of the scooter will typically be formed of metal, preferably a light-weight metal. Aluminum and stainless steel are suitable. The drive components, including the toothed members and sprocket wheels may be formed of a plastics material or die-cast metal. The ground wheels will generally be provided with pneumatic tires.

The pedal scooter according to the invention may be modified to include one or more further features such as a front suspension, a rear suspension, a gear change mechanism operated from the handle bars, and fold-down handle-bars for ease of transportation when the scooter is not in use. The scooter may be available in different sizes and strengths, for use e.g by children or adults.

The invention will now be further described, purely by way of example, with reference to the accompanying drawings, in which:

FIG. 3 shows the scooter of FIG. 1 in top elevation;

FIG. 6 is a sectional view taken on the line 1—1 in FIG. 4;

Figure 1:
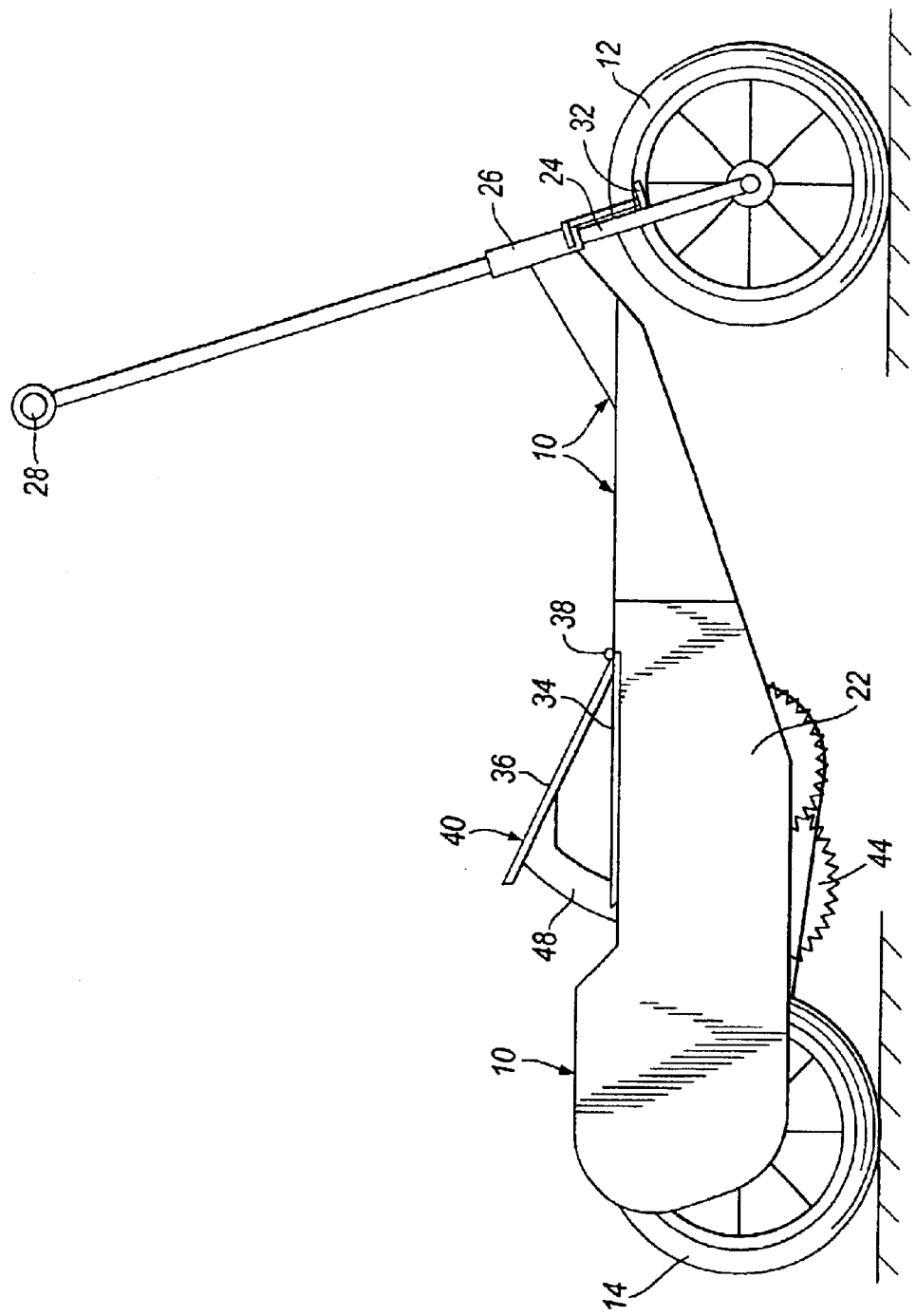
FIG. 1 shows a rider operated three wheel scooter according to the invention, shown in side elevation.
Figure 2:
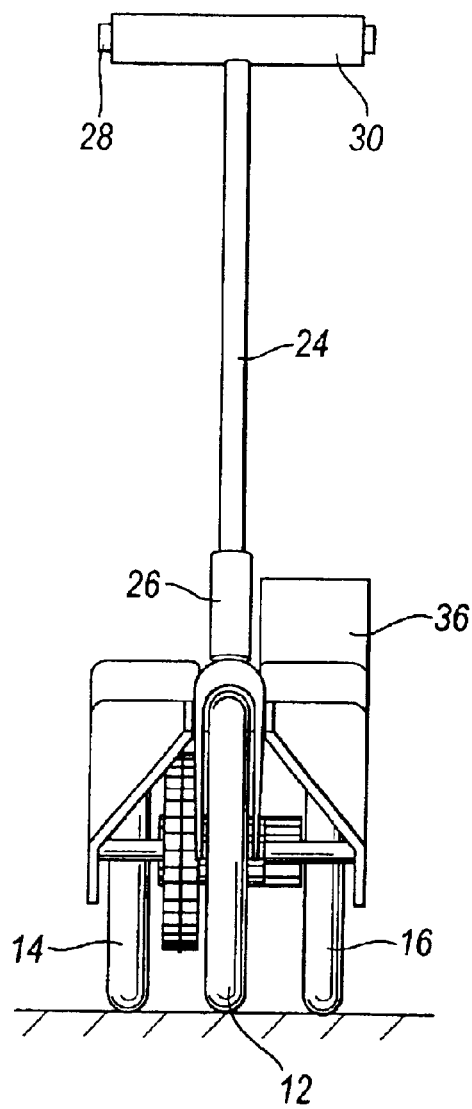
FIG. 2 shows the scooter of FIG. 1 in front elevation.
Figure 5:
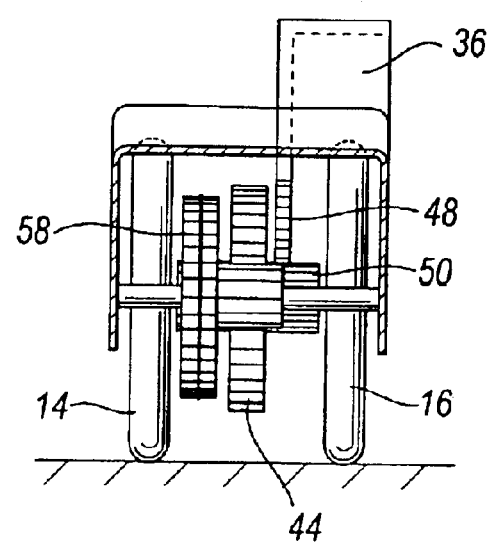
FIG. 5 is a sectional view taken on the line 2—2 in FIG. 4.
Figure 4:
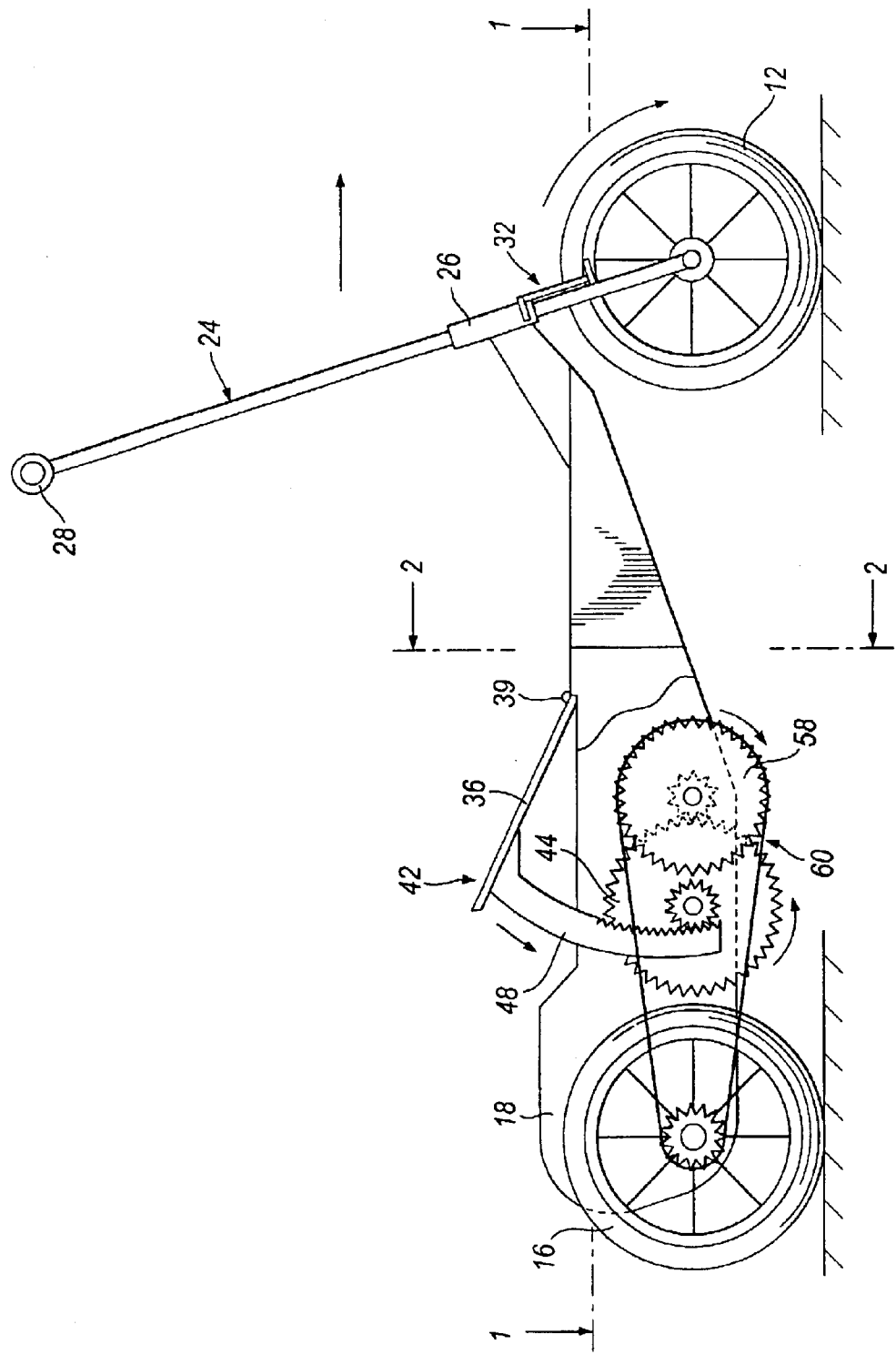
FIG. 4 shows the scooter of FIG. 1 in cut-away side elevation.

The drawings show a pedal scooter including a hollow frame 10 carrying a steerable front ground wheel 12 and two rear ground wheels 14, 16. The frame 10 includes side plates 18 and a top plate 20 together constituting a housing 22.

The front wheel is carried on a front wheel fork 24, a tubular intermediate part of which passes through a sleeve 26 fixed to the frame 10. The upper end of the front wheel fork 24 carries height adjustable handle bars 28, 30. Brakes 32 of known construction, are provided on the front ground wheel 12.

Two reciprocating pedals 34, 36 are pivotally mounted side by side on the frame 10 for independent pivotal movement about in-line pedal axes 38, 39. Each reciprocating pedal has a foot engaging surface 40, 42 positioned rearward of the pedal axes 38, 39. The reciprocating pedals 34, 36 are spring biased in an upward direction, a stop members (not shown) being provided to limit the extent of their upward and downward movements.

A flywheel 44 is mounted within the housing 22 for rotation on an axle 46 carried by the frame 10.

A one-way drive connection is provided between each reciprocating pedal 34, 36 and the flywheel 44.

For the reciprocating pedal 34, this one-way drive connection includes a toothed arm 48 carried on the reciprocating pedal 34 and engaging a intermediate gearwheel 50 slidably mounted for rotation on the flywheel axle 46. A forward ratchet device shown in detail in FIGS. 7, 8 and 9 is provided between the intermediate gearwheel 50 and on the flywheel 44, the intermediate gearwheel 50 being biased into face-to-face contact with the flywheel 44.

For the reciprocating pedal 36, this one-way drive connection includes a toothed arm 49 carried on the reciprocating pedal 36 and engaging a intermediate gearwheel 51 slidably mounted for rotation on the flywheel axle 46. Another forward ratchet device is provided between the intermediate gearwheel 51 and on the flywheel 44, the intermediate gearwheel 51 being biased into face-to-face contact with the flywheel 44.

Figure 7:
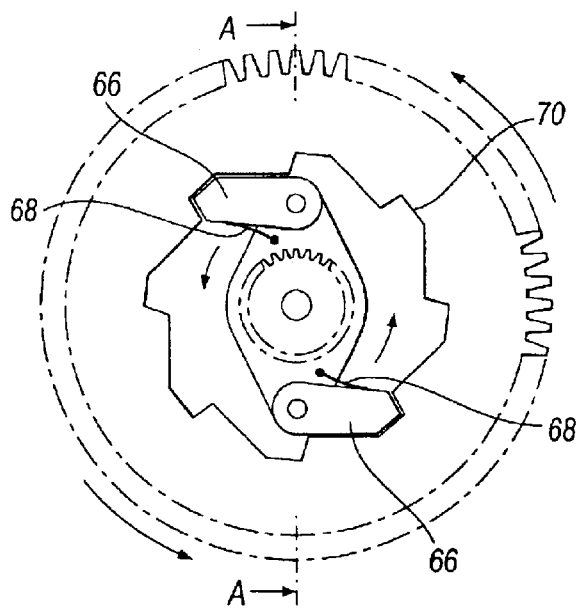
FIG. 7 shows a view of the flywheel of the scooter of FIG. 1, from one side.
Figure 8:
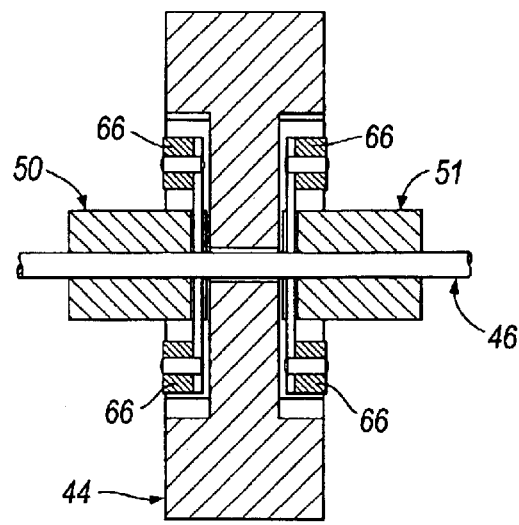
FIG. 8 is a sectional view taken on the line A—A in FIG. 7.
Figure 9:
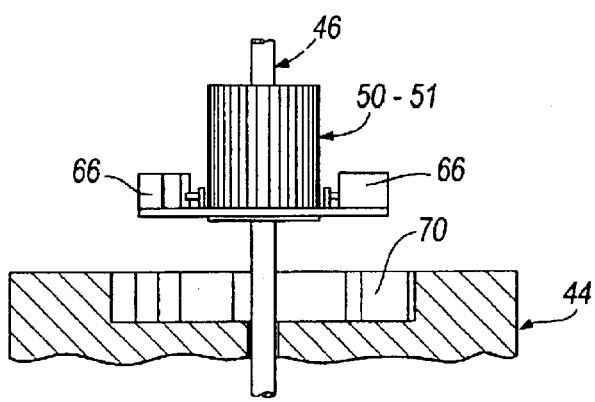
FIG. 9 is a partly exploded part sectional view of the flywheel and one of the intermediate gear wheels of the scooter of FIG. 1.

As shown in FIGS. 7, 8 and 9, the ratchet device includes a pair of ratchet levers 66 carried by the intermediate gear wheel 50 (the arrangement on intermediate gear wheel 51 is complimentary). The levers are urged by spring steel tensioners 68 against a cam surface 70 formed on the inside of the flywheel 44. The cam surface 70 is so shaped as to engage the spring levers 66 as the intermediate gear wheel 50 rotates in an anti-clockwise direction as shown in FIG. 7 and to allow the levers to run over the cam surface 70 if the intermediate gear wheel 50 rotates in a clockwise direction as shown in FIG. 7.

A one-way drive connection is also provided between the flywheel 44 and each rear ground wheel 14, 16. This one-way drive connection includes a small gear wheel 54 mounted on a forward axle 56, and in drive connection with the flywheel 44. A sprocket wheel 58 is carried on the forward axle 56 for rotation with the small gear wheel 54. A drive chain 60 is carried on the sprocket wheel 58 and engages a rear intermediate sprocket wheel 62 mounted on the frame 10 about the same axle 64 as the rear ground wheels 14, 16. A rear ratchet device of known construction is provided between the rear intermediate sprocket wheel 62 and the rear axle 64 carrying the rear ground wheels 14, 16.

In use, the rider stands on the scooter, preferably with the heel of each foot on the foot engaging surfaces 40, 42 of the reciprocating pedals 34, 36 and the toe of each foot positioned directly above the pedal axis 38. The rider holds on to the handle bars 28, 30.

Downward pivotal movement of the right reciprocating pedal 34 by application of the rider's right heel thereto, or downward pivotal movement of the left reciprocating pedal 36 by application of the rider's left heel to the foot engaging surface 42 causes rotation of the flywheel 44 in a drive direction, which in turn causes rotation of the rear ground wheels 14, 16 in the drive direction, driving the scooter forwards.

Rotation of the intermediate gearwheel 50 in one direction causes the forward ratchet device to lock, transferring drive from the intermediate gearwheel 50 to the flywheel 44, while rotation of the intermediate gearwheel 50 in the opposite direction unlocks the ratchet device enabling the flywheel 44 to continue to rotate in the drive direction. The ratchet device thus enables upward pivotal return movement of the each reciprocating pedal 34, 36 to be possible without preventing continued rotation of the flywheel 44 and the rear ground wheels 14, 16 in the drive direction.

Rotation of the rear intermediate sprocket wheel 62 in one direction causes the rear ratchet device to lock, transferring drive from the rear intermediate sprocket wheel 62 to the rear ground wheels 14, 16, while rotation of the rear intermediate sprocket wheel 62 in the opposite direction unlocks the rear ratchet device enabling the rear ground wheels 14, 16 to continue to rotate in the drive direction.

Thus up and down motion of the reciprocating pedals 34, 36 continuously drives the scooter forwards. The reciprocating pedals may most comfortably be operated alternately. However, the independent drive mechanisms from the two reciprocating pedals enables the reciprocating pedals to be operated together, for a more interesting experience for the rider.

I claim:

1. A pedal scooter comprising a frame carrying a single steerable front ground wheel and two rear ground wheels, said frame having a horizontal top surface, two reciprocating pedals pivotally mounted side by side on said top surface of said frame for independent pivotal movement about a common pedal axis located at said top surface, each reciprocating pedal being spring biased in an upward direction, and each having a foot engaging surface positioned rearward of said pedal axis, a flywheel mounted for rotation on said frame, a one-way drive connection between each reciprocating pedal and said flywheel and a one-way drive connection between said flywheel and each rear ground wheel.

2. The pedal scooter of claim 1, wherein said one-way drive connection between said reciprocating pedal and said flywheel includes a toothed member carried on said reciprocating pedal engaging a toothed intermediate wheel mounted for rotation on said frame and a ratchet device between said toothed intermediate wheel and said flywheel.

3. A scooter of claim 2 wherein said toothed intermediate wheel and said flywheel are mounted on said frame for rotation about a common axis.

4. A scooter of claim 2, wherein said toothed intermediate wheel is biased into face-to-face contact with said flywheel.

5. The pedal scooter of claim 1, wherein said one-way drive connection between said flywheel and said rear ground wheel includes a drive member driven from said flywheel and engaging a rear intermediate gear wheel mounted for rotation on said frame and a ratchet device between said rear intermediate gear wheel and said rear ground wheel.

6. The pedal scooter of claim 5, wherein said drive member is a drive chain or a drive belt.

7. The pedal scooter of claim 6, wherein said rear intermediate gearwheel and said rear ground wheel are mounted on said frame for rotation about a common axis.

8. The pedal scooter of claim 1, wherein said frame includes side plates and a top plate together constituting a housing within which said flywheel is mounted.

* * * * *